US012705010B2

(12) United States Patent
Kang et al.

(10) Patent No.: US 12,705,010 B2
(45) Date of Patent: Aug. 11, 2026

(54) WIRELESS SCREEN MIRRORING SYSTEM

(71) Applicant: BENQ CORPORATION, Taipei City (TW)

(72) Inventors: Po-Ching Kang, Taipei City (TW); Chen-Chi Wu, Taipei City (TW); Chin-Fu Chiang, Taipei City (TW); Cheng-Chieh Juan, Taipei City (TW)

(73) Assignee: BENQ CORPORATION, Taipei City (TW)

( * ) Notice: Subject to any disclaimer, the term of this patent is extended or adjusted under 35 U.S.C. 154(b) by 0 days.

(21) Appl. No.: 19/014,354

(22) Filed: Jan. 9, 2025

(65) Prior Publication Data

US 2026/0023520 A1 Jan. 22, 2026

(30) Foreign Application Priority Data

Jul. 16, 2024 (TW) ................................ 113126630

(51) Int. Cl.
*G06F 3/14* (2006.01)
*H04W 76/10* (2018.01)

(52) U.S. Cl.
CPC .......... *G06F 3/1454* (2013.01); *G06F 3/1446* (2013.01); *H04W 76/10* (2018.02)

(58) Field of Classification Search
CPC .... G06F 3/1454; G06F 3/1446; H04W 76/10; H04N 21/4122; H04N 21/43615; H04N 21/43637; H04N 21/44227; G09G 2370/16
See application file for complete search history.

(56) References Cited

U.S. PATENT DOCUMENTS

2014/0029503 A1 1/2014 Kambhatla et al.
2014/0104139 A1* 4/2014 Buchner ................ G06F 3/147 345/1.3

(Continued)

FOREIGN PATENT DOCUMENTS

CN 100466530 C 3/2009
CN 1849824 B 7/2012

(Continued)

OTHER PUBLICATIONS

Office action of counterpart application by EPO on Jul. 18, 2025.

(Continued)

*Primary Examiner* — Yaron Cohen

(57) ABSTRACT

A wireless screen mirroring system is provided. The wireless screen mirroring system includes a first transmitting device and a second transmitting device, a first receiving device and a second receiving device, and a router. The router has at least one of the functions of a controller or a bridge. The router selects one of the first transmitting device and the second transmitting device as a designated transmitting device, and selects at least one of the first receiving device and the second receiving device as a designated receiving device based on a configuration file. The router pairs the designated transmitting device with the at least one designated receiving device. After pairing is completed, the designated transmitting device displays audiovisual data, transmits the audiovisual data to the at least one designated receiving device, and the at least one designated receiving device displays the audiovisual data.

20 Claims, 9 Drawing Sheets

(56) References Cited

U.S. PATENT DOCUMENTS

| | | | | |
|---|---|---|---|---|
| 2016/0007084 | A1 | 1/2016 | Kim et al. | |
| 2019/0075488 | A1* | 3/2019 | Sarin | H04W 4/18 |
| 2019/0332344 | A1* | 10/2019 | Somaiah | H04N 21/4126 |

FOREIGN PATENT DOCUMENTS

| | | | |
|---|---|---|---|
| CN | 101056389 | B | 4/2013 |
| TW | 202130218 | A | 8/2021 |
| TW | 202142040 | A | 11/2021 |
| WO | 2016103556 | A1 | 6/2016 |

OTHER PUBLICATIONS

Six common modes of routers: AP, wireless routing, relay, bridge, client and WISP, Jun. 15, 2022.

Zqz_qrs, Detailed explanation of P2P network, CSDN blog, Sep. 27, 2022.

* cited by examiner

| Mirror | One transmitting device | Two transmitting device |
|---|---|---|
| One receiving device | Configuration 1 (Config1) | Configuration 3 (Config3)--Scenario A1 |
| Two receiving device | Configuration 2 (Config2) | Configuration 4 (Config4)--Scenario B1 |

FIG. 2A

| Extend | One transmitting device | Two transmitting device |
|---|---|---|
| One receiving device | Configuration 5 (Config5) | Configuration 7 (Config7)--Scenario A2 |
| Two receiving device | Configuration 6 (Config6) | Configuration 8 (Config8)--Scenario B2 |

WIRELESS SCREEN MIRRORING SYSTEM

This application claims the benefit of Taiwan application Serial No. 113126630, filed Jul. 16, 2024, the disclosure of which is incorporated by reference herein in its entirety.

TECHNICAL FIELD

The disclosure relates to wireless screen mirroring system.

BACKGROUND

Currently, screen mirroring devices in a wireless presentation system (WPS) can have two types of technological architectures. The first type employs USB data with an application for the screen mirroring transmitters. The second type does not rely on an application but instead directly utilizes a video input as the source of screen mirroring for the screen mirroring transmitters.

The core of the second type lies in that the screen mirroring transmitter has extended display identification data (EDID), and the screen mirroring transmitter can communicates with the graphics card of a laptop to create a virtual display. At present, there is no market-available screen mirroring transmitter having more than one virtual display. Thus, developing screen mirroring transmitters capable of supporting multiple virtual displays, enabling a single screen mirroring transmitter to pair with two or more screen mirroring receivers, is a key focus of current industry efforts.

SUMMARY

According to one embodiment, a wireless screen mirroring system is provided. The wireless screen mirroring system includes a first transmitting device and a second transmitting device, a first receiving device and a second receiving device, and a router. The router has at least one of the functions of a controller or a bridge. The router selects one of the first transmitting device and the second transmitting device as a designated transmitting device, and selects at least one of the first receiving device and the second receiving device as a designated receiving device based on a configuration file. The router pairs the designated transmitting device with the at least one designated receiving device. After pairing is completed, the designated transmitting device displays audiovisual data, transmits the audiovisual data to the at least one designated receiving device, and the at least one designated receiving device displays the audiovisual data.

BRIEF DESCRIPTION OF THE DRAWINGS

FIG. 2A and FIG. 2B illustrate examples of a usage scenario matrix used as configuration file content according to an embodiment of this disclosure.

Figure 1:
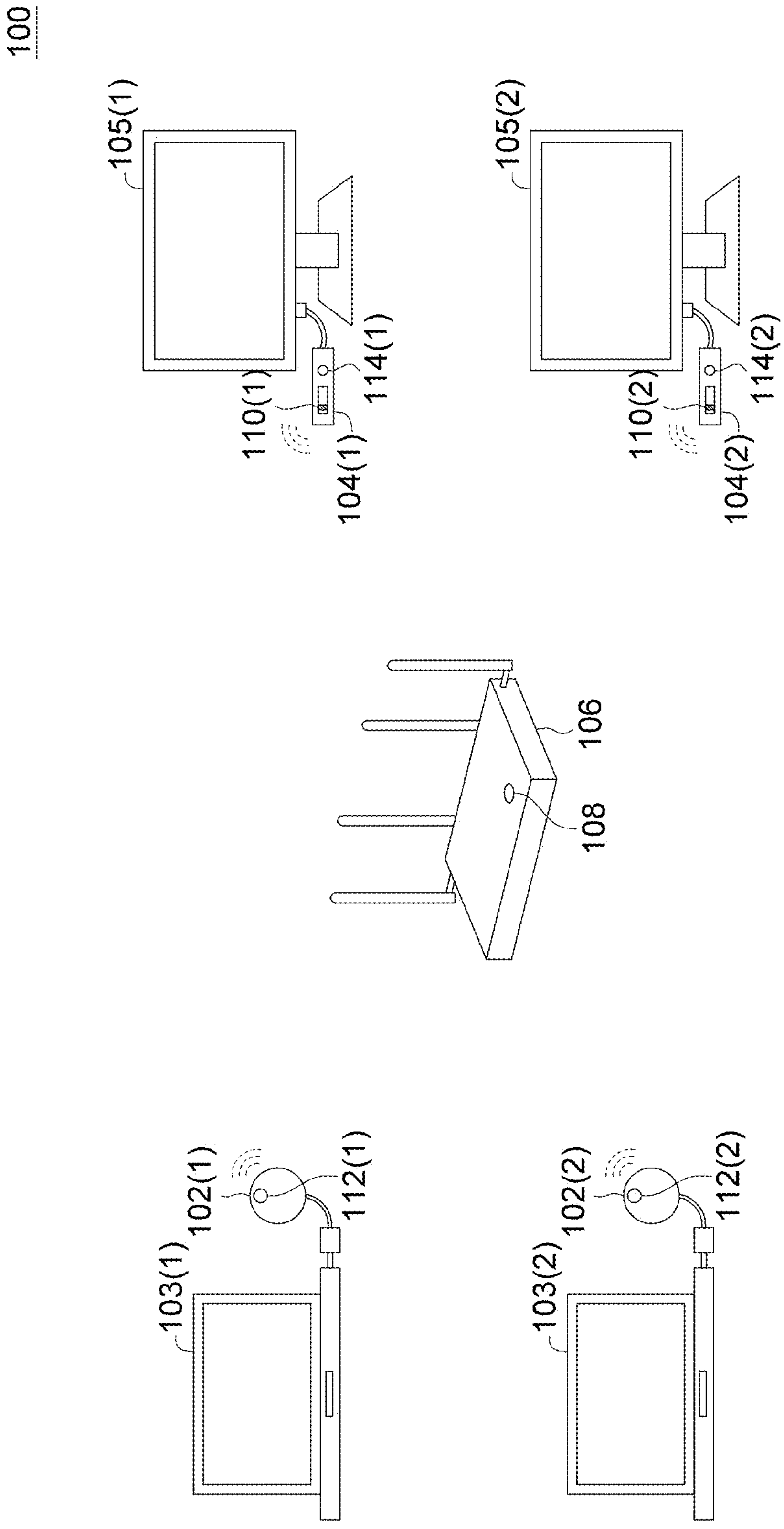
FIG. 1 illustrates a schematic diagram of a wireless screen mirroring system according to an embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which illustrates a schematic diagram of a wireless screen mirroring system according to an embodiment of this disclosure. The wireless screen mirroring system 100 includes a first transmitting device 102(1), a second transmitting device 102(2), a first receiving device 104(1), a second receiving device 104(2), and a router 106. The router 106 has the functions of at least one of a controller or a bridge. Based on a configuration file, the router 106 selects the first transmitting device 102(1) or the second transmitting device 102(2) as the designated transmitting device and selects at least one of the first receiving device 104(1) and the second receiving device 104(2) as the designated receiving device(s). The router then pairs the designated transmitting device with the designated receiving device(s). After completing the pairing, the designated transmitting device displays audiovisual data, the designated transmitting device transmits audiovisual data to the designated receiving device(s), and the designated receiving device(s) display the audiovisual data.

The term "screen mirroring" refers that the screen image on one screen is displayed in another screen. The first transmitting device 102(1) and the second transmitting device 102(2) are respectively connected to a first computer 103(1) and a second computer 103(2). The first receiving device 104(1) and the second receiving device 104(2) are respectively connected to a first display device 105(1) and a second display device 105(2). Each of the first display device 105(1) and the second display device 105(2) is used to display mirror or extended images.

In one embodiment, the router 106 can be integrated with the first receiving device 104(1) or the second receiving device 104(2). In one embodiment. The configuration file records the pairing relationships between the first transmitting device 102(1) and at least one designated receiving device (e.g., at least one of the first receiving device 104(1) and the second receiving device 104(2)) and the pairing relationships between the second transmitting device 102(2) and at least one designated receiving device (e.g., at least one of the first receiving device 104(1) and the second receiving device 104(2)).

After pairing is completed, the designated transmitting device transmits audiovisual data via the router 106 to the one or more designated receiving devices. For example, assuming the first transmitting device 102(1) is selected as the designated transmitting device and both of the first receiving device 104(1) and the second receiving device 104(2) are selected as the designated receiving devices, the transmitting device 102(1) is paired with the first receiving device 104(1) and the first receiving device 104(2) through the router 106. After pairing, the first transmitting device 102(1), which is the designated transmitting device, sends audiovisual data displayed on the first computer 103(1) via the router 106 to the first receiving device 104(1) and the second receiving device 104(2), which are the designated receiving devices. The first receiving device 104(1) and the second receiving device 104(2) transmit the audiovisual data to the first display device 105(1) and the second display device 105(2) for display. Thus, the audiovisual data displayed on the first computer 103(1) can be simultaneously shown on both of the first display device 105(1) and the second display device 105(2).

The configuration file mentioned above may be provided by one of the first transmitting device 102(1) and the second transmitting device 102(2), or provided by one of the first receiving devices 104(1) and the second receiving device 104(2), or provided by the router 106. For instance, one setting item in the configuration file may record the first transmitting device 102(1) as the designated transmitting device, while the first receiving device 104(1) and the second receiving device 104(2) are the designated receiving devices.

The transmission path for the audiovisual data between the designated transmitting device and the designated receiving device(s) can be controlled by the router 106, the designated transmitting device, the designated receiving device(s), or a third-party controller. The third-party controller may operate via an application (App) or exist as a physical controller. For example, one scenario for the transmission path involves audiovisual data being transmitted from the first transmitting device 102(1) to the first receiving device 104(1) and the second receiving device 104(2) via the router 106.

When a pairing function option of the router 106 is activated (e.g., the first pairing key 108 of the router 106 is pressed or triggered), and the first receiving device 104(1) and the second receiving device 104(2) are switched to a station mode (e.g., by adjusting the position of a pairing role selection switch on the receiving devices), the router 106 acts as an access point (AP) to establish wireless connections with the first transmitting device 102(1), the second transmitting device 102(2), the first receiving device 104(1), and the second receiving device 104(2), configured in station mode. The router 106 then performs pairing between the designated transmitting device and at least one designated receiving device based on the configuration file mentioned above.

The router 106 includes a first pairing key 108, the first receiving device 104(1) includes a pairing role selection switch 110(1), and the second receiving device 104(2) includes a pairing role selection switch 110(2). The pairing role selection switches are used to select between a host mode and a station mode. The first transmitting device 102(1) has a second pairing key 112(1), and the second transmitting device 102(2) has a second pairing key 112(2). Similarly, the first receiving device 104(1) has a third pairing key 114(1), and the second receiving device 104(2) has a third pairing key 114(2). When the pairing role selection switch 110(1) of the first receiving device 102(1) and the pairing role selection switch 110(2) of the second receiving device 102(2) are set to the station mode, and the first pairing key 108 of the router 106, the second pairing key 112(1) of the first transmitting device 102(1) and the second pairing key 112(2) of the second transmitting device 102(2), and the third pairing key 114(1) of the first receiving device 104(1) and the third pairing keys 114(2) of the second receiving device 104(2) are activated, the router 106 acts as an access point to be wirelessly connected with the first transmitting device 102(1), the second transmitting device 102(2), the first receiving device 104(1), and the second receiving device 104(2), configured in station mode.

In more detail, pushing the pairing role selection switch to different positions configures the corresponding receiving device to be in host mode or station mode. For example, when the pairing role selection switch is pushed to a first position, the corresponding receiving device is configured to be in host mode; when the pairing role selection switch is pushed to a second position, the corresponding receiving device is configured to be in station mode. In host mode, the receiving device can directly communicate wirelessly with the corresponding transmitting device. In station mode, the receiving device communicates wirelessly with the router 106. When the receiving device communicates wirelessly with the router 106, the receiving device is paired and communicates with the transmitting device as defined in the configuration file.

For example, assume the pairing role selection switch 110(1) of the first receiving device 104(1) is set to the second position to configure the first receiving device 104(1) in station mode and the pairing role selection switch 110(2) of the second receiving device 104(2) is set to the second position to configure the second receiving device 104(2) in station mode. When the first pairing key 108 of the router 106 is activated, the router 106 performs the pairing operations and the router 106 in host mode broadcasts a pairing service set identifier (SSID). Then, when the second pairing key 112(1) of the first transmitting device 102(1) is activated, the first transmitting device 102(1) searches for the pairing SSID and the password is input, so that the first transmitting device 102(1) is connected to the router 106. Similarly, when the second pairing key 112(2) of the second transmitting device 102(2) is activated, the second transmitting device 102(2) searches for the pairing SSID and the password is input, so that the second transmitting device 102(2) is connected to the router 106. When the third pairing key 114(1) of the first receiving device 104(1) is activated, the first receiving device 104(1) searches for the pairing SSID and the password is input, so that the first receiving device 104(1) is connected to the router 106. When the third pairing key 114(2) of the second receiving device 104(2) is activated, the second receiving device 104(2) searches for the pairing SSID and the password is input, so that the second receiving device 104(2) is connected to the router 106. The router 106 thus acts as an access point to be wirelessly connected with the first transmitting device 102(1), the second transmitting device 102(2), the first receiving device 104(1), and the second receiving device 104(2), which are configured in station mode.

Optionally, after pairing is completed, in certain scenarios, at least one designated receiving device can be switched to host mode. The designated transmitting device communicates wirelessly with the one or more designated receiving devices. The designated transmitting device transmits audiovisual data directly to the one or more designated receiving devices mentioned above. For instance, even after pairing is completed and the router 106 is wirelessly connected the first transmitting device 102(1), the second transmitting device 102(2), the first receiving device 104(1), and the first receiving device 104(2) in station mode, some transmitting devices and some receiving devices may terminate their wireless connection with the router 106 and switch to direct wireless communication with each other. This reduces the load on the router 106 and frees up some network bandwidth of router 106. Since the transmitting devices and the receiving devices were previously paired, the transmitting devices and the receiving devices can reuse the earlier pairing information for quick reconnection and direct communication.

Furthermore, after pairing is completed, the wireless screen mirroring system 100 can operate in a first operational mode or a second operational mode. In the first operational mode, the designated transmitting device transmits audiovisual data to the one or more designated receiving devices mentioned above via the router 106. In the second operational mode, at least one designated receiving device switches to host mode, and the designated transmitting device directly communicates wirelessly with the one or more designated receiving devices mentioned above to transmit audiovisual data.

For instance, after pairing is completed, when the wireless screen mirroring system 100 operates in the first operational mode, the designated first transmitting device 102(1) transmits audiovisual data via the router 106 to the designated first receiving devices 104(1) and the designated second receiving devices 104(2). When the wireless screen mirroring system 100 operates in the second operational mode, the designated first receiving device 104(1) switches to host mode, and the designated first transmitting device 102(1) communicates directly with the first receiving device 104 (1), bypassing the router 106. Direct communication between the transmitting device 102(1) and the receiving device 104(1) is performed. Therefore, the bandwidth of the router 106 is not occupied, and the network transmission amount on the router 106 is reduced.

The wireless screen mirroring system 100 can switch from the first operational mode to the second operational mode under certain conditions as follows. For example, after pairing, when the data transmission amount of the router 106 exceeds a predefined transmission threshold in the first operational mode, the wireless screen mirroring system 100 switches to the second operational mode to reduce the data transmission amount of the router 106.

Alternatively, after pairing is completed, when the transmission time of audiovisual data from the designated transmitting device to the one or more designated receiving devices via the router 106 exceeds a transmission time threshold, the wireless screen mirroring system 100 switches to the second operational mode. In other words, when the data transmission time from the designated transmitting device to the designated receiving device(s) via the router 106 is excessively long, the wireless screen mirroring system 100 can switch to the second operational mode to reduce the data transmission amount of the router 106.

Additionally, in certain circumstances, the router 106 may instruct the first transmitting device or the second transmitting device transmitting audiovisual data to adjust the compression rate of the audiovisual signal to reduce the data transmission amount of the audiovisual signal and lower the data transmission amount of the router 106. For example, when the router 106 detects that the number of transmitting devices wirelessly connected to the router 106 exceeds a transmitting device threshold, or the number of receiving devices exceeds a receiving device threshold, or the total number of transmitting devices and receiving devices exceeds a device threshold, the router 106 may request the first transmitting device 102(1) or the second transmitting device 102(2), which are transmitting the audiovisual signal, to adjust the compression rate of the audiovisual signal to reduce the data transmission amount of the audiovisual signal. Therefore, the data transmission amount of the router 106 will be reduced.

Furthermore, when the connection quality of the router 106 is poor or the router 106 is overloaded, the router 106 may request the first transmitting device 102(1) or the second transmitting device 102(2), which are transmitting audiovisual data, to adjust the compression rate of the audiovisual signal to decrease data transmission amount of the audiovisual data and reduce the data transmission amount of the router.

In one embodiment, when the router 106 detects that the number of wirelessly connected transmitting devices and receiving devices exceeds a device threshold, or data traffic exceeds a traffic threshold, the router 106 may send a command signal to idle transmitting devices and corresponding receiving devices to disconnect from the router and establish a direct wireless connection between the idle transmitting and receiving devices. For example, suppose the first transmitting device 102(1) and corresponding first receiving device 104(1) are idle. When the router 106 detects that the number of wirelessly connected transmitting devices and receiving devices exceeds a device threshold, or data traffic exceeds a traffic threshold, the router 106 can send a command signal to the idle transmitting device 102(1) and corresponding receiving device 104(1) to disconnect the wireless connection between the first transmitting device 102(1) and the router 106 and disconnect the wireless connection between the first receiving device 104 (1) and the router 106. Then, a direct wireless connection between the idle first transmitting device 102(1) and the corresponding first receiving devices 104(1) is established to reduce the data transmission amount of the router 106.

In one embodiment, the router 106 may allocate uplink and downlink bandwidth of a local area network to the designated transmitting device and the one or more designated receiving devices based on the number of transmitting devices and receiving devices wirelessly connected to the router 106. For instance, assuming the router 106 has a bandwidth of 600 Mbps. When a pair of transmitting device and receiving device is connected to the router 106, the router reserves 100 Mbps uplink bandwidth (the bandwidth for the transmitting device to uplink to the router 106) and 100 Mbps downlink bandwidth (the bandwidth for the router to downlink to the receiving device). This ensures sufficient bandwidth for data transmission for the paired of transmitting device and receiving device, while the remaining bandwidth is allocated to other devices connected to the router 106.

Refer to FIG. 2A and FIG. 2B, which illustrate examples of a usage scenario matrix used as configuration file content according to an embodiment of this disclosure. The configuration file may be represented by at least one usage scenario matrix, and each usage scenario matrix records the configuration relationships of multiple transmitting devices and receiving devices. These transmitting devices may include the first transmitting device and the second transmitting device, and the receiving devices may include the first receiving device and the second receiving device.

FIG. 2A shows a table for mirror display by the receiving devices, while FIG. 2B shows a table for extended display. FIG. 2A shows Configurations 1 to 4 (Config1 to Config4), corresponding to one or two receiving devices and one or two transmitting devices. FIG. 2B shows Configurations 5 to 8 (Config5 to Config8), corresponding to one or two receiving devices and one or two transmitting devices.

Figure 3A:
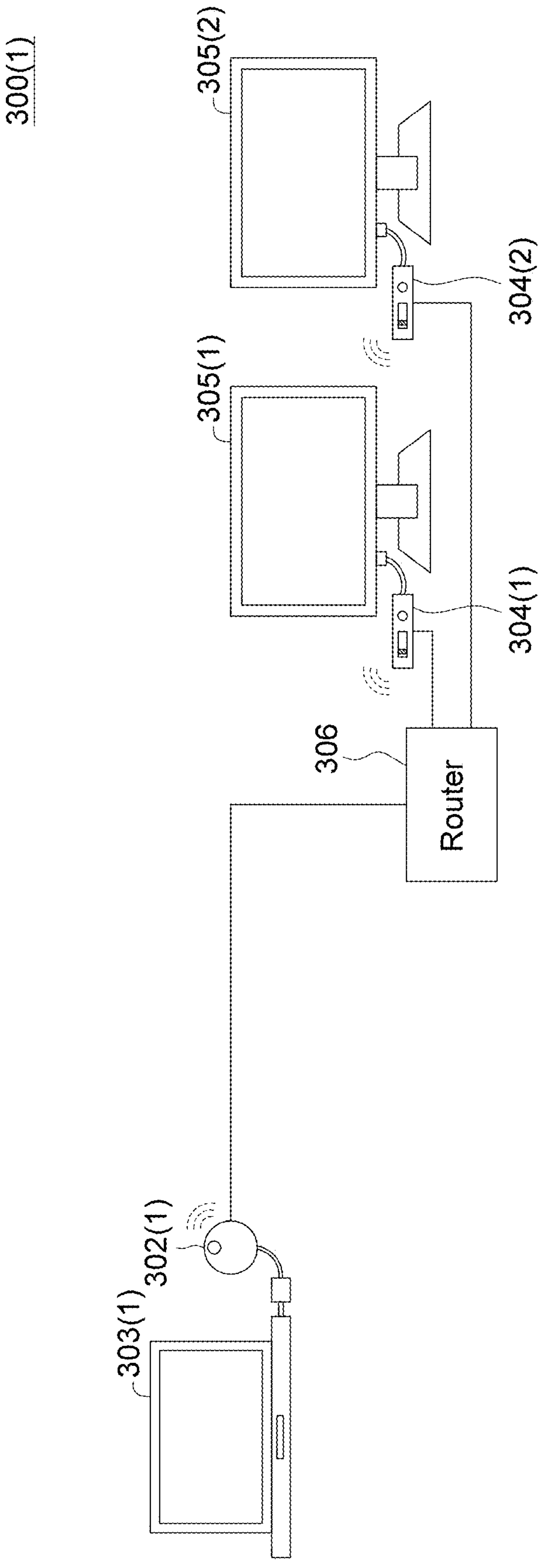
FIG. 3A to FIG. 3D schematically illustrate the wireless screen mirroring system corresponding to FIG. 2A and FIG. 2B according to an embodiment of this disclosure.

Refer to FIG. 3A to FIG. 3D, which schematically illustrate the wireless screen mirroring system corresponding to FIG. 2A and FIG. 2B according to an embodiment of this disclosure. As shown in FIG. 2A and FIG. 3A, the router 306 is wirelessly connected to the transmitting device 302(1), the receiving device 304(1) and the receiving device 304(2). In Configuration 1 (Config1), the wireless screen mirroring system 300(1) includes one transmitting device 302(1) and one receiving device 304(1). The computer 303(1) connected to transmitting device 302(1) displays audiovisual data Video(1), the transmitting device 302(1) transmits the audiovisual data Video(1) to the receiving device 304(1), and the audiovisual data Video(1) is displayed on the display device 305(1) connected to the receiving device 304(1). In Configuration 2 (Config2), the wireless screen mirroring system 300(1) includes one transmitting device 302(1) and two receiving devices 304(1) and 304(2). The computer 303(1) connected to the transmitting device 302(1) displays audiovisual data Video(1), the transmitting device 302(1) transmits the audiovisual data Video(1) to the receiving device 304(1), and the audiovisual data Video(1) is displayed on the display device 305(1) and the display device 305(2) connected to the receiving device 304(1) and the receiving device 304(2), respectively.

Figure 3B:
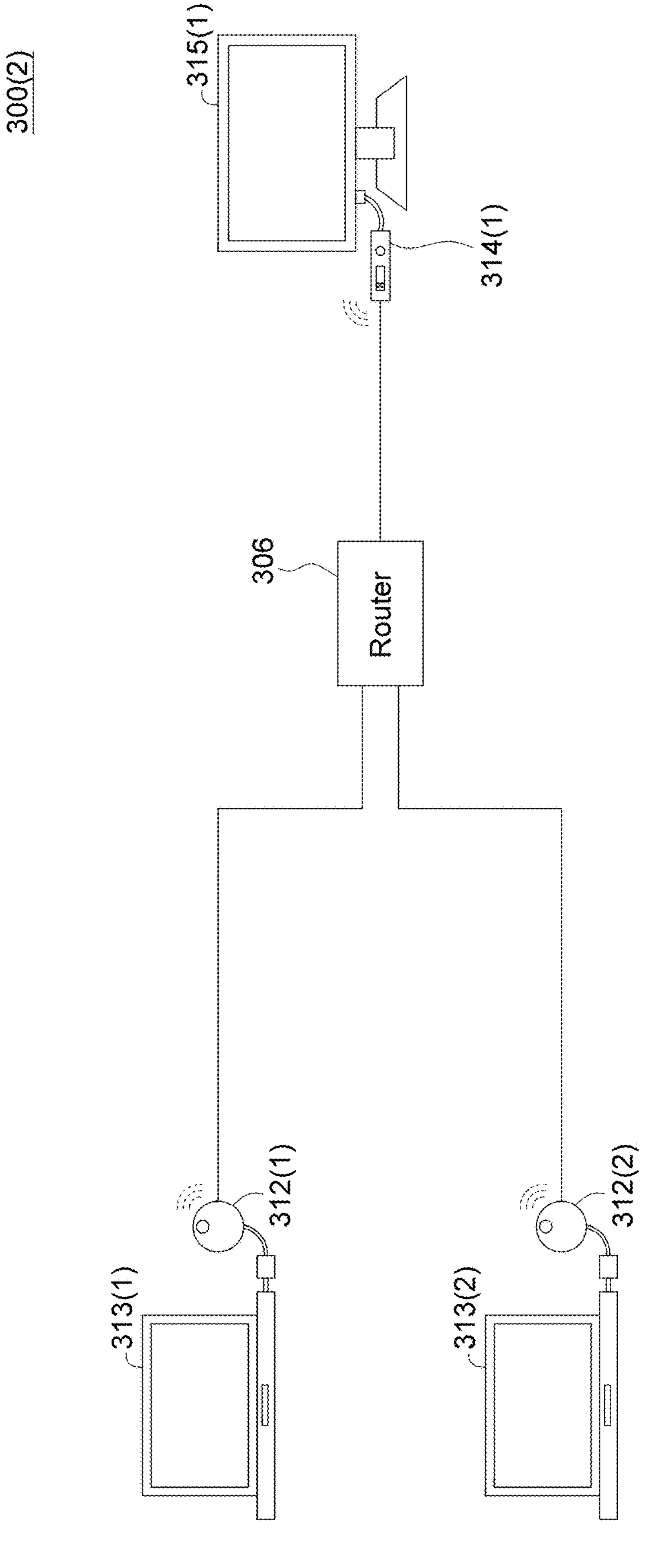

As shown in FIG. 2A and FIG. 3B, in Configuration 3 (Config3), the wireless screen mirroring system 300(2) includes two transmitting devices 312(1) and 312(2) and one receiving device 314(1). Computer 313(1) connected to the transmitting device 312(1) displays the audiovisual data Video(1), while the computer 313(2) connected to the transmitting device 312(2) displays the audiovisual data Video (2). By setting the wireless screen mirroring system 300(2) to scenarios A1, in which the receiving device 314(1) is chosen to be paired with the transmitting device 312(1) or the transmitting device 312(2), for example, the transmitting device 312(1) transmits the audiovisual data Video(1) to the receiving device 314(1) or the transmitting device 312(2) transmits the audiovisual data Video(2) to the receiving device 314(1). Therefore, the display device 315(1) connected to the receiving device 314(1) display the audiovisual data Video(1) or the audiovisual data Video(2).

Figure 3C:
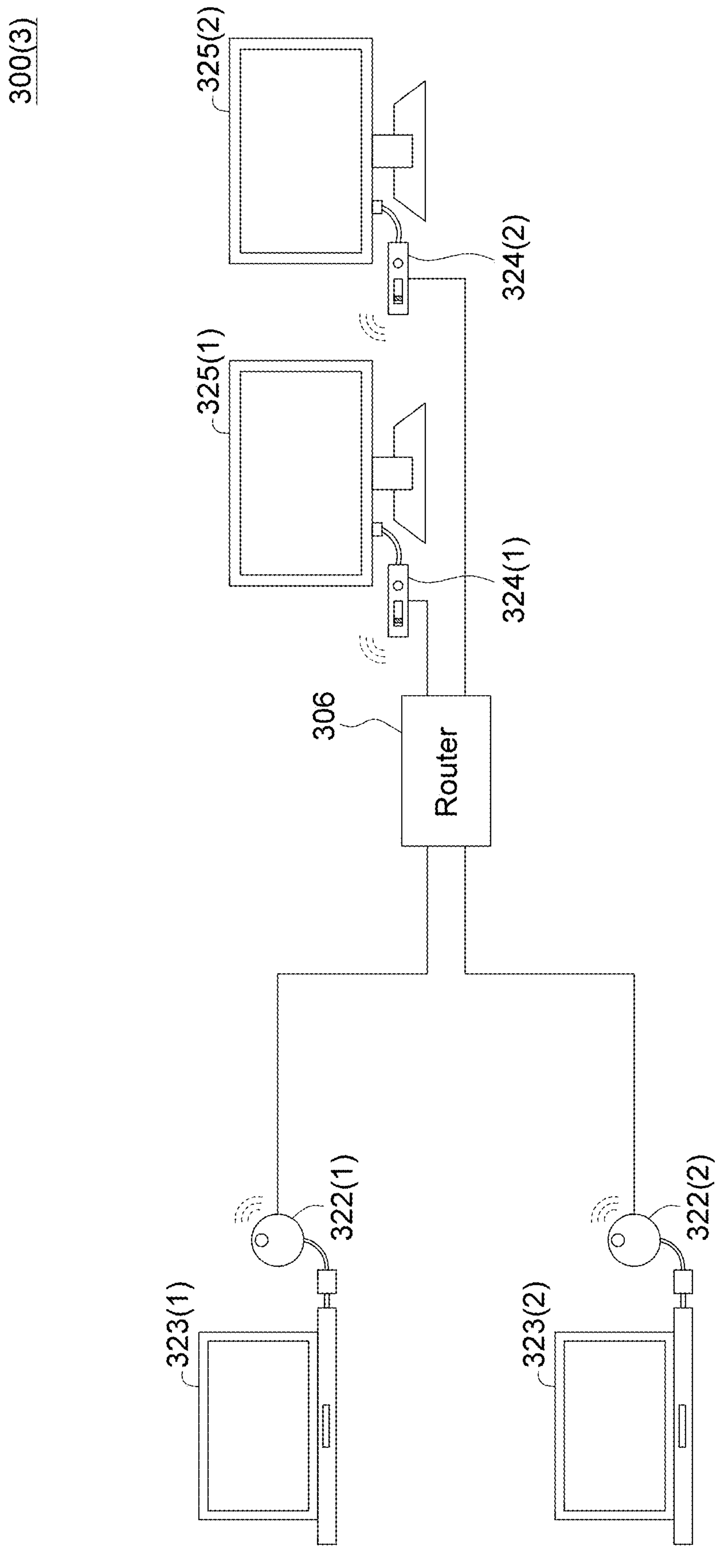

As shown in FIG. 2A and FIG. 3C, in Configuration 4 (Config4), the wireless screen mirroring system 300(3) includes two transmitting devices 322(1) and 322(2) and two receiving devices 324(1) and 324(2). Computer 323(1) connected to the transmitting device 322(1) displays audiovisual data Video(1), while computer 323(2) connected to the transmitting device 322(2) displays audiovisual data Video (2). By setting the wireless screen mirroring system 300(3) to scenario B1, the receiving device 324(1) is paired with either the transmitting device 322(1) or the transmitting device 322(2). Similarly, the receiving device 324(2) is paired with either the transmitting device 322(1) or the transmitting device 322(2), for example. In this scenario, the transmitting device 322(1) transmits audiovisual data Video (1) to either the receiving device 324(1) or the receiving device 324(2), while the transmitting device 322(2) transmits audiovisual data Video(2) to either the receiving device 324(1) or the receiving device 324(2). Therefore, the display device 325(1) connected to the receiving device 324(1) displays the audiovisual data Video(1) or the audiovisual data Video(2), while the display device 325(2) connected to the receiving device 324(2) displays the audiovisual data Video(1) or the audiovisual data Video(2). The display devices 325(1) and 325(2) can display the same or different audiovisual data.

As shown in FIG. 2B and FIG. 3A, in Configuration 5 (Config5), the wireless screen mirroring system 300(1) includes one transmitting device 302(1) and one receiving device 304(1). The computer 303(1) connected to the transmitting device 302(1) displays a primary screen and also has an extended screen. The transmitting device 302(1) transmits the extended screen as audiovisual data Video(1) to the receiving device 304(1). This enables the display device 305(1), connected to the receiving device 304(1), to display the audiovisual data Video(1), which corresponds to the extended screen. In Configuration 6 (Config6), the wireless screen mirroring system 300(1) includes one transmitting device 302(1) and two receiving devices 304(1) and 304(2). The computer 303(1) connected to the transmitting device 302(1) displays a primary screen and also has an extended screen. The transmitting device 302(1) transmits the extended screen as audiovisual data Video(1) to both of the receiving device 304(1) and the receiving device 304(2). The display device 305(1) connected to the receiving device 304(1) displays the audiovisual data Video(1), which corresponds to the extended screen; the display device 305(2) connected to the receiving device 304(2) displays the audiovisual data Video(1), which corresponds to the extended screen.

As shown in FIG. 2B and FIG. 3B, in Configuration 7 (Config7), the wireless screen mirroring system 300(2) includes two transmitting devices 312(1) and 312(2) and one receiving device 314(1). The computer 313(1) connected to the transmitting device 312(1) displays a primary screen and has an extended screen. The computer 313(2) connected to the transmitting device 312(2) displays a primary screen and has an extended screen. By setting the wireless screen mirroring system 300(2) to scenario A2 (e.g., the receiving device 314(1) is paired with the transmitting device 312(1), or the receiving device 314(1) is paired with the transmitting device 312(2)), the receiving device 314(1) can display the extended screen of the computer 313(1) or the computer 313(2).

As shown in FIG. 2B and FIG. 3C, in Configuration 8 (Config8), the wireless screen mirroring system 300(3) includes two transmitting devices 322(1) and 322(2) and two receiving devices 324(1) and 324(2). The computer 323(1) connected to the transmitting devices 322(1) displays a primary screen and has an extended screen. The computer 323(2) connected to the transmitting device 322(2) displays a primary screen and has an extended screen. By setting the wireless screen mirroring system 300(3) to scenario B2, the receiving device 324(1) is paired with either the transmitting device 322(1) or 322(2), and the receiving device 324(2) is paired with either the transmitting device 322(1) or 322(2). The display device 325(1), connected to the receiving device 324(1), displays the extended screen of either the computer 323(1) or 323(2). Similarly, the display device 325(2), connected to the receiving device 324(2), displays the extended screen of either the computer 323(1) or 323(2). Display devices 325(1) and 325(2) may display the same or different audiovisual data.

Figure 3D:
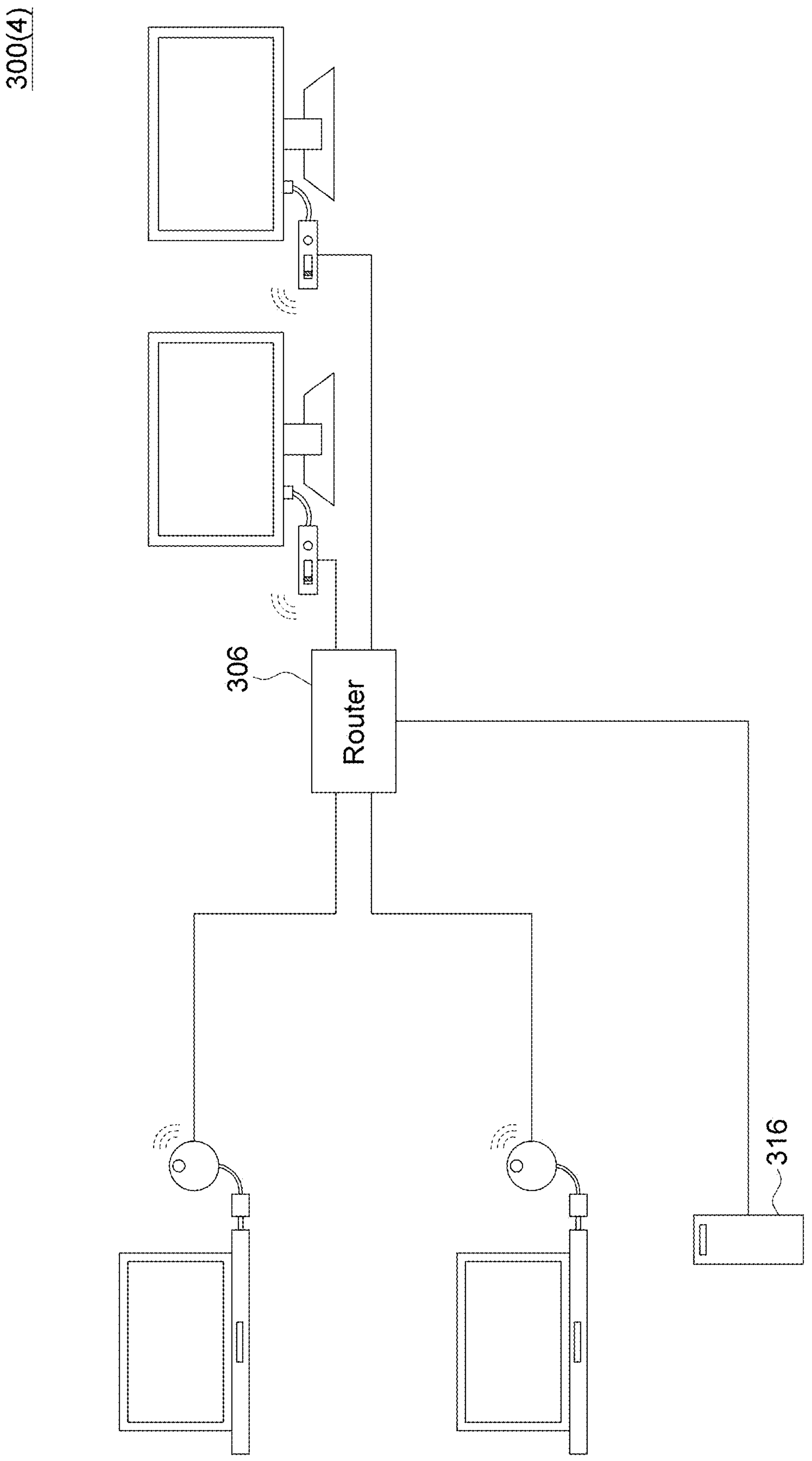

As shown in FIG. 3D, in the wireless screen mirroring system 300(4), a third-party controller 316 can be used to control the wireless screen mirroring system 300(4). The third-party controller 316, for example, is wirelessly connected to the router 306 to send control signals.

Figure 4:
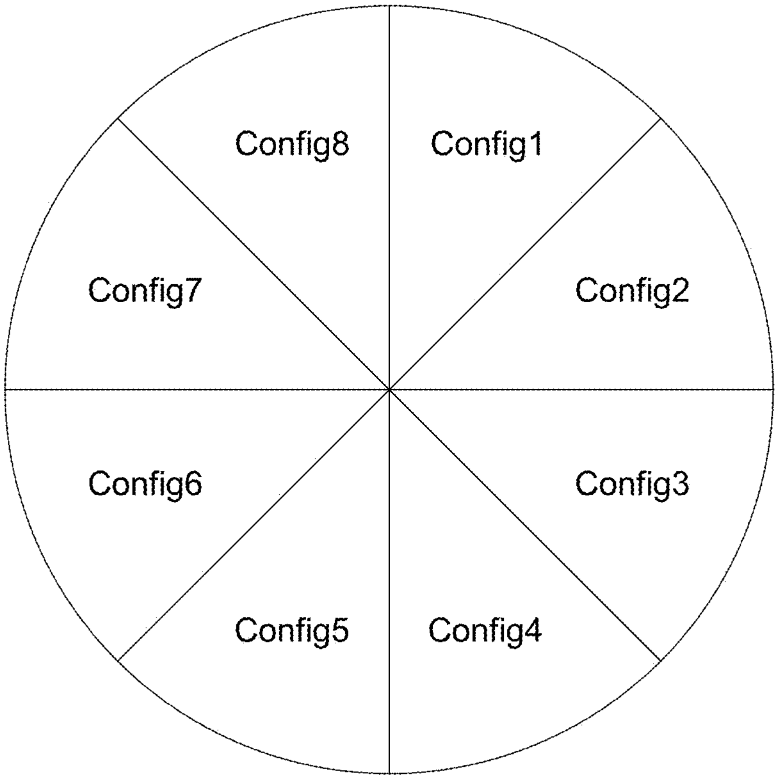
FIG. 4 illustrates an example of a selection interface corresponding to a configuration file according to an embodiment of the disclosure.

Refer to FIG. 4, which illustrates an example of a selection interface corresponding to a configuration file according to an embodiment of the disclosure. As an example, the configuration file may include a usage scenario matrix. The selection interface 400 includes a circular region divided into eight segments for user selection, corresponding to Configurations 1 to 8 (Config1 to Config8). Depending on the number of transmitting devices and receiving devices connected to the router 306, available configurations may be highlighted or indicated distinctly to inform the user. For instance, in a situation with one transmitting device and two receiving devices, only Configurations 1, 2, 5, and 6 (Config1, Config2, Config5, and Config6) are available. These configurations can be displayed with lighting effects, highlighting, or other conspicuous means to indicate that Configurations 1, 2, 5, and 6 (Config1, Config2, Config5, and Config6) are available for selection. The selection interface depicted in FIG. 4 is merely an example and the disclosure is not limiting thereto.

Figure 5A:
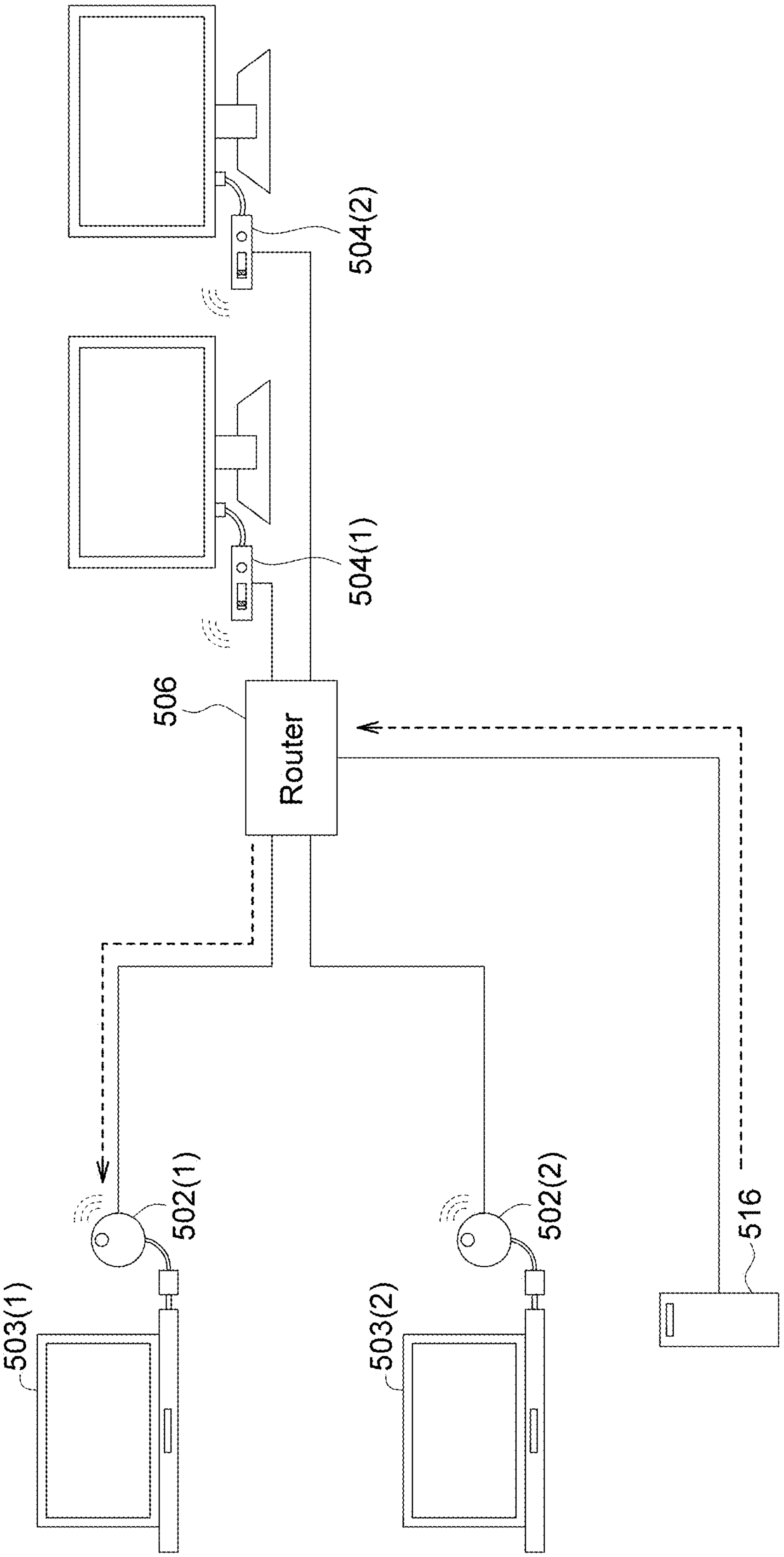
FIG. 5A and FIG. 5B illustrate examples of control signal streaming and audiovisual data streaming in a wireless screen mirroring system according to an embodiment of this disclosure.
Figure 5B:
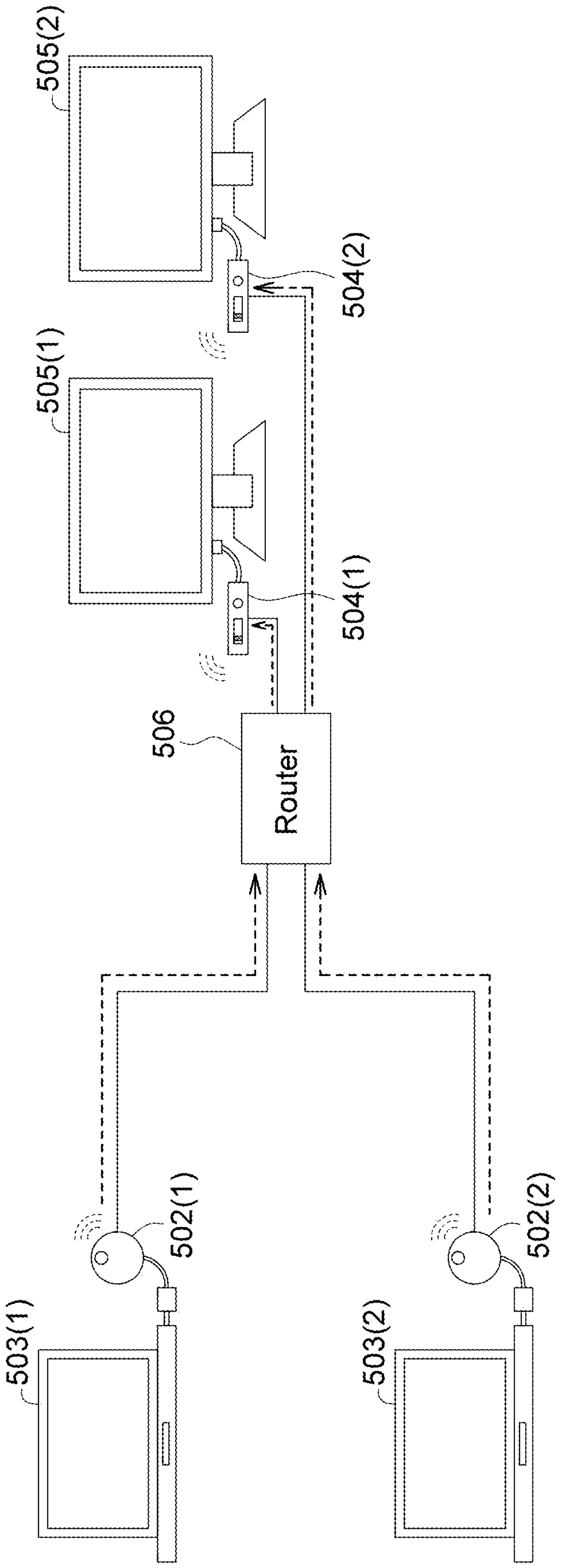

Refer to FIG. 5A and FIG. 5B, which illustrate examples of control signal streaming and audiovisual data streaming in a wireless screen mirroring system according to an embodiment of this disclosure. FIG. 5A illustrates the control signal streaming, while FIG. 5B shows the audiovisual data streaming. In FIG. 5A, for example, when a user wants to change the output screen of computer 503(1) connected to transmitting device 502(1) from "mirror" to "extended" output screen, the user uses the controller 516 to switch the output screen of computer 503(1) to be "extended" output screen. The controller 516 sends the command to the router 506. Then, the router 506 transmits the command to the transmitting device 502(1), and the transmitting device 502(1) transmits the command via USB (Universal Serial Bus) HID (Human Interface Device) to the computer 503(1). After the computer 503(1) receives the command, the computer 503(1) changes the display output to be "extended" output screen. The transmitting devices 502(1) and 502(2) have the functions of simulating USB HID devices.

As shown in FIG. 5B, when the transmitting devices 502(1) and 502(2) have audiovisual data to be transmitted, the data streaming direction is illustrated in FIG. 5B. Transmitting devices 502(1) and 502(2) send the primary or extended screen of computers 503(1) and 503(2) to the router 506. Based on the configuration file (e.g., usage scenario matrices shown in FIG. 2A and FIG. 2B), assume the current setting is "mirror" with Configuration 4 (Config4), and the scenario B1 specifies that display devices 505(1) and 505(2) show the primary screens of the computers 503(1) and 503(2). The transmitting device 502(1) transmits the audiovisual data of the primary screen of the computers 503(1) to the receiving devices 504(1) through the router 506, while the transmitting device 502(2) transmits the audiovisual data of the primary screen of the computers 503(2) to the receiving devices 504(2) through the router 506. Therefore, the display devices 505(1) and 505(2) display the primary screen of the computers 503(1) and 503(2), respectively.

In one embodiment, the router 506 can detect the purpose of the user's online activities. For instance, during a video conference between user A on computer 503(1) and a remote user B via the Internet, the router 506 can prioritize the video conference packages to ensure sufficient bandwidth for video conference. Alternatively, the router 506 can determine that a video conference is the main activity, then the router 506 can send commands to instruct the transmitting devices 502(1) and 502(2) and receiving devices 504(1) and 504(2) to adjust the "compression rate" and "buffer size" of audiovisual data to enhance video quality during the conference.

In one embodiment, as shown in FIG. 5A, users can use the third-party controller 516, the router's control interface, or the physical control interface on the transmitting devices 502(1) or 502(2) to specify current operation modes of "Video Mode" or "Graphic Mode", for example. The "compression rate" and "buffer size" corresponding to different modes for audiovisual data are adjusted accordingly.

In one embodiment, except when the transmitting device 502(1) or 502(2) and the receiving device 504(1) or 504(2) are connected to the router 506, if other household devices are also wirelessly connected to the router 506 and cause excessive CPU load (e.g., the total number of connected devices exceeds a threshold or the outgoing bandwidth surpasses the limit), the router 506 may actively instruct the transmitting device 502(1) and the receiving device 504(1), which are not transmitting or receiving audiovisual data, to form an independent small group. That is, the transmitting device 502(1) and receiving device 504(1) are directly connected wirelessly to reduce the CPU load on the router.

In one embodiment, the wireless screen mirroring system can utilize calendar meeting settings to enable or disable a specific screen mirroring mode associated with a configuration file during designated time periods. For example, the third-party controller 516 may be integrated with software, such as calendar software. The third-party controller 516 can directly log into the calendar software by using account and passwords. And, through a "designated device plugin module" of the calendar software, the third-party controller 516 can specify that a receiving device can accept audiovisual data from a transmitting device during a specific time period defined in the calendar.

Compared to conventional pairing mechanisms, the conventional pairing mechanisms cannot pair one transmitting device with two receiving devices. Typically, the transmitting device requires wireless connections via WDS (Wireless Distribution System), WISP (Wireless Internet Service Provider), WiFi Bridge, or WiFi Mesh to link two separate WLANs (Wireless Local Area Networks), each including one transmitting device and one receiving device. However, these approaches involve complex configurations, lack user-friendliness, and require additional wireless modules, thereby increasing costs.

The wireless screen mirroring system described in this disclosure offers ease of configuration and rapid switching. By utilizing a configuration file, the router can quickly designate one transmitting device from a number of transmitting devices and at least one receiving device (e.g., two receiving devices) from a number of receiving devices. This enables a single transmitting device to pair simultaneously with at least one receiving devices. Furthermore, configuration files facilitate quick scenario switching, greatly enhancing user convenience.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A wireless screen mirroring system, comprising:

a first transmitting device and a second transmitting device;

a first receiving device and a second receiving device;

a router, having at least one of the functions of a controller or a bridge, wherein the router selects one of the first transmitting device and the second transmitting device as a designated transmitting device, and selects at least one of the first receiving device and the second receiving device as a designated receiving device based on a configuration file, and the router pairs the designated transmitting device with the at least one designated receiving device;

wherein after pairing is completed, the designated transmitting device displays audiovisual data, transmits the audiovisual data to the at least one designated receiving device, and the at least one designated receiving device displays the audiovisual data;

wherein by utilizing the configuration file, the router designates one of the first transmitting device and the second transmitting device as the designated transmitting device, and designates the first receiving device and the second receiving device as the designated receiving devices, so that one transmitting device is paired simultaneously with two receiving devices.

2. The wireless screen mirroring system according to claim 1, wherein the configuration file is provided by one of the first transmitting device and the second transmitting device, or the configuration file is provided by one of the first receiving device and the second receiving device, or the configuration file is provided by the router.

3. The wireless screen mirroring system according to claim 1, wherein a transmission path of the audiovisual data between the designated transmitting device and the at least one designated receiving device is controlled by the router, the designated transmitting device, the at least one designated receiving device, or a third-party controller.

4. The wireless screen mirroring system according to claim 3, wherein the third-party controller is operated via an application (App) or the third-party controller is a physical controller.

5. The wireless screen mirroring system according to claim 1, wherein when a pairing function option of the router is activated, and the first receiving device and the second receiving device are switched to a station mode, the router functions as an access point (AP) to be wirelessly connected to the first transmitting device, the second transmitting device, the first receiving device, and the second receiving device, which are configured in the station mode, and the router pairs the designated transmitting device with the at least one designated receiving device based on the configuration file.

6. The wireless screen mirroring system according to claim 1, wherein the router has a first pairing button, each of the first receiving device and the second receiving device has a pairing role selection switch for selecting a host mode or a station mode, each of the first transmitting device and second transmitting device has a second pairing button, and each of the first receiving device and second receiving device has a third pairing button, when the pairing role selection switches of the first receiving device and second receiving device are set to the station mode, and the first pairing button of the router is activated, the second pairing buttons of the first transmitting device and second transmitting device is activated, and the third pairing buttons of the first receiving device and second receiving device are activated, the first transmitting device and the second transmitting device are configured in the station mode, the router functions as an access point to be wirelessly connected to the first transmitting device, the second transmitting device, the first receiving device, and the second receiving device in the station mode.

7. The wireless screen mirroring system according to claim 1, wherein after pairing is completed, the designated transmitting device transmits the audiovisual data to the at least one designated receiving device via the router.

8. The wireless screen mirroring system according to claim 1, wherein after pairing is completed, the at least one designated receiving device switches to a host mode, and the designated transmitting device wirelessly communicates with the at least one designated receiving device, the designated transmitting device directly transmits the audiovisual data to the at least one designated receiving device.

9. The wireless screen mirroring system according to claim 1, wherein after pairing is completed, the wireless screen mirroring system operates in a first operation mode or a second operation mode;

in the first operation mode, the designated transmitting device transmits the audiovisual data to the at least one designated receiving device via the router;

in the second operation mode, the at least one designated receiving device switches to a host mode, and the designated transmitting device wirelessly communicates with the at least one designated receiving device, the designated transmitting device directly transmits the audiovisual data to the at least one designated receiving device.

10. The wireless screen mirroring system according to claim 9, wherein after pairing is completed, when the data transmission amount of the router in the first operation mode exceeds a transmission threshold, the system switches to the second operation mode.

11. The wireless screen mirroring system according to claim 9, wherein after pairing is completed, when a transmission time of the audiovisual data from the designated transmitting device to the at least one designated receiving device via the router in the first operation mode exceeds a transmission time threshold, the wireless screen mirroring system switches to the second operation mode.

12. The wireless screen mirroring system according to claim 1, wherein when the router detects that the number of transmitting devices wirelessly connected to the router exceeds a transmission device threshold, or the number of receiving devices wirelessly connected to the router exceeds a receiving device threshold, or the total number of transmitting devices and receiving devices wirelessly connected to the router exceeds a device threshold, the router instructs the first transmitting device or the second transmitting device transmitting the audiovisual data to adjust a compression rate of the audiovisual signal to reduce the data transmission amount.

13. The wireless screen mirroring system according to claim 1, wherein when the router's connection quality is poor or the router is currently overloaded, the router instructs the first transmitting device or the second transmitting device transmitting the audiovisual data to adjust a compression rate of the audiovisual signal.

14. The wireless screen mirroring system according to claim 1, wherein when the router detects that the total number of wirelessly connected transmitting devices and receiving devices exceeds a device threshold, or the data traffic exceeds a traffic threshold, the router sends a command signal to idle transmitting devices and corresponding receiving devices thereof to be disconnected from the router and connect directly with each other.

15. The wireless screen mirroring system according to claim 1, wherein the wireless screen mirroring system allows a specific screen mirroring mode associated with the configuration file to be enabled or disabled during a specified time period based on calendar meeting settings.

16. The wireless screen mirroring system according to claim 1, wherein the router is integrated with the first receiving device or the second receiving device.

17. The wireless screen mirroring system according to claim 1, wherein the router allocates an uplink bandwidth and a downlink bandwidth of a local area network to the designated transmitting device and the at least one designated receiving device based on the number of the transmitting devices and the receiving devices wirelessly connected to the router.

18. The wireless screen mirroring system according to claim 1, wherein the configuration file records pairing relationship between the first transmitting device and the at least one designated receiving device, and pairing relationship between the second transmitting device and the at least one designated receiving device.

19. The wireless screen mirroring system according to claim 1, wherein the configuration file records at least one usage scenario matrix that includes configuration relationships of a plurality of transmitting devices and a plurality of receiving devices, the plurality of the transmitting devices include the first transmitting device and the second transmitting device, and the plurality of the receiving devices include the first receiving device and the second receiving device.

20. The wireless screen mirroring system according to claim 1, wherein the first transmitting device and the second transmitting device are respectively connected to a first computer and a second computer, and the first receiving device and the second receiving device are respectively connected to a first display device and a second display device, each of the first display device and the second display devices are used to display a mirror images or an extended images.

* * * * *